Oct. 9, 1962 A. R. LARDIN 3,057,653
RELEASE AND EJECTOR APPARATUS
Filed Dec. 7, 1959
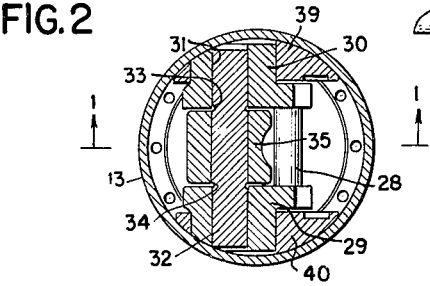
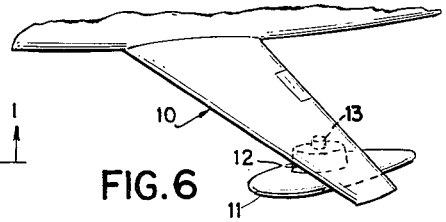
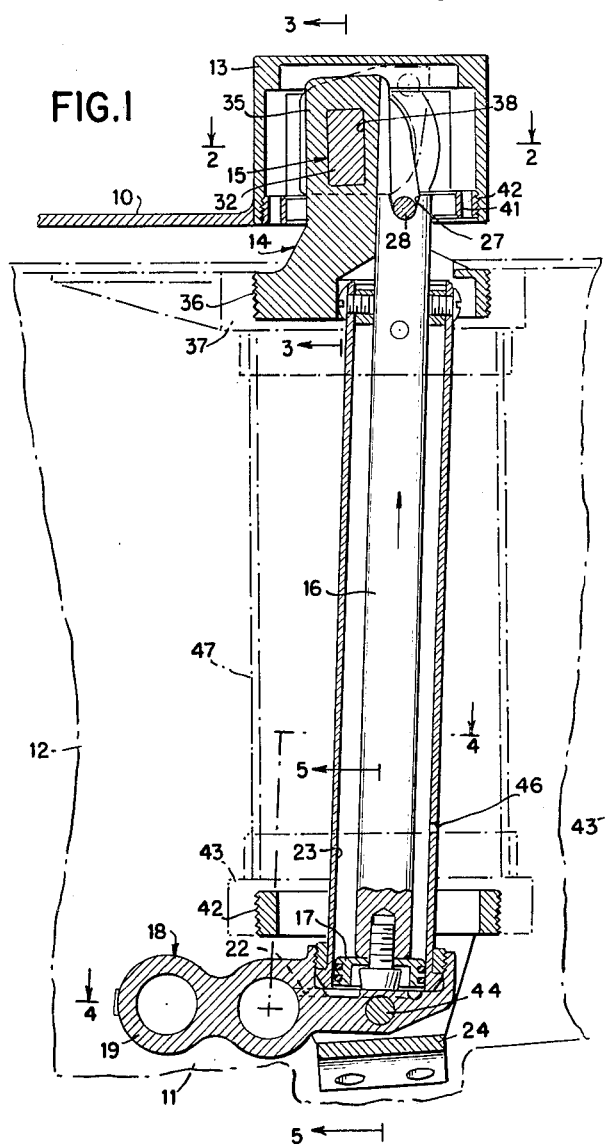
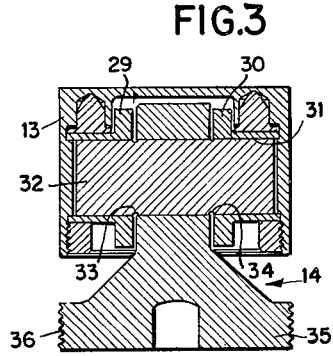
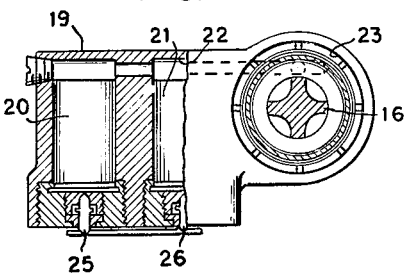
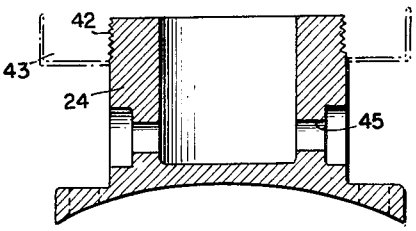
*INVENTOR.*
Arthur R. Lardin
BY
ATTORNEY United States Patent Office 3,057,653
Patented Oct. 9, 1962

3,057,653
RELEASE AND EJECTOR APPARATUS
Arthur R. Lardin, Hawkinsville, Ga., assignor to Breeze Corporations, Inc., Union, N.J., a corporation of New Jersey
Filed Dec. 7, 1959, Ser. No. 857,939
6 Claims. (Cl. 294—83)

This invention relates to release and ejector mechanisms, such as are used to jettison fuel tanks and other equipment from aircraft and missiles when they are no longer needed.

In certain types of aircraft and missiles, it is customary to have certain apparatus such as fuel tanks, pontoons and the like attached to the wings or other parts of the aircraft in such a manner that they can be dropped during flight, either for emergency or operational purposes. The release and ejector mechanisms by means of which the aparatus is jettisoned must be light in weight, positive in operation and capable of withstanding a wide variety of aerodynamic and inertial forces prior to the release action.

Accordingly, it is an object of the present invention to provide a release and ejector mechanism assembly for aircraft which will be extremely light in weight and occupy a minimum amount of space.

Another object of the present invention is to provide a release and ejector mechanism having its own power source for severing the fuel tank or other apparatus from the aircraft.

A further object of the present invention is to provide a release and ejector mechanism capable of supporting substantial loads during the takeoff and flight of the aircraft.

A feature of the present invention is its use of a simple cartridge operated piston for severing the connection between the fuel tank or apparatus to be jettisoned and the aircraft.

Another feature of the present invention is its use of a shear bar provided with failure points which will break and release the load when desired.

Still another feature of the present invention is its small space and weight requirements which makes it particularly suited for missile installation.

The invention consists of the construction, combination and arrangement of parts, as herein illustrated, described and claimed.

In the accompanying drawing, forming a part hereof, is illustrated one form of embodiment of the invention in which:

FIGURE 1 is a view in longitudinal section of a release and ejector mechanism assembly made in accordance with the present invention.

FIGURE 2 is a cross sectional view taken on line 2—2 in FIGURE 1 looking in the direction of the arrows.

FIGURE 3 is a cross sectional view taken on line 3—3 in FIGURE 1, looking in the direction of the arrows.

FIGURE 4 is a cross sectional view taken on line 4—4 in FIGURE 1, looking in the direction of the arrows.

FIGURE 5 is a cross sectional view of the attachment fitting taken on line 5—5 in FIGURE 1, looking in the direction of the arrows.

FIGURE 6 is a somewhat isometric view of a portion of the aircraft wing and the pylon and fuel tank showing the manner in which they are attached to a wing through the operation of the release and ejector mechanism, herein described.

Referring to the drawings and particularly to FIGURES 1 and 6, 10 indicates a wing structure of an aircraft, missile or the like, to which a fuel tank 11 or other piece of apparatus is to be attached. A pylon 12 having a somewhat streamlined shape is attached between the wing 10 and the fuel tank 11 in the customary manner. The wing structure 10 is provided with a socket 13 to receive the upper end of the release and ejector mechanism generally indicated at 14.

The release and ejector mechanism consists of an attachment portion located at the top thereof which is received within the wing 10 as indicated at 15, a driven portion in the nature of a piston rod and pistons 16, 17, and a drive section generally indicated at 18, at the lower end of the release and ejector structure.

The drive section 18 in the preferred embodiment consists of a two chambered block 19, adapted to receive cartridges 20, 21 therein (see FIGURE 4). The block 19 is suitably bored as indicated at 22 to provide a path for the gases of combustion to leave the block 19 and enter the bottom of the cylinder 23.

The cylinder 23 has therein the piston 17 with the piston rod 16, connected thereto. As the gases of combustion enter the cylinder 23, they force the piston 17 and the piston rod in the direction of the attachment portion 15 of the device.

The cylinder 23 is attached to the cartridge block 19 and the entire assembly is secured to the fuel tank 11 by means of the bracket 24, best shown in FIGURES 1 and 5.

The cartridges 20, 21 may be detonated electrically by means of the contacts 25, 26 shown in FIGURE 4. Failure to detonate both of the cartridges is unlikely inasmuch as either cartridge will fire sympathetically upon the detonation of the other. The upper end of the piston rod 16 is forked as indicated at 27 to receive therein a small bar 28. The bar 28 interconnects two bearings 29, 30 (best shown in FIGURES 2 and 3) which are each provided with a rectangular slot 31.

A shear bar 32 is carried within the socket 13 by the bearings 29, 30. The shear bar 32 being received within the rectangular slot 31 in each of said bearings. The shear bar 32 is rectangular in cross section and is provided with weakening notches 33, 34 (see FIGURE 2) to facilitate breaking of the bar under torsion when the release and ejector mechanism is put into operation.

A pylon supporting bracket 35 is also received within the socket 13, and extends downwardly from the wing. The lower end of the bracket 35 is threaded as indicated at 36 for attachment to a nut 37, welded within the pylon structure 12. The bracket 35 is provided with a rectangular slot 38, through which the shear bar 32 extends. The weakening notches 33, 34, on the shear bar 32 are so disposed that they lie adjacent each side of the bracket 35 as shown in FIGURE 2.

The ends of the bearing members 29, 30, are freely received within arcuate supports 39, 40, which are slipped within the socket 13 when the apparatus is assembled. The attachment portion 15 of the release and ejector mechanism is held within the socket 13 by means of the threaded ring 41. The ring 41 is screwed into the socket 13 and engages the threads 42 therein.

When the cartridges 20, 21 are detonated, the piston 17 and piston rod 16, are forced upwardly and the bearing members 29, 30 are rotated by the action of the top of the piston rod 16 against the bar 28. The shear bar 32 is subjected to rotational forces at each end thereof while the center of the said bar is held stationary by the bracket 35. The shear bar 32 is caused to break along the weakening notches 33, 34, thereby releasing the bracket 35 from the socket 13.

The pylon 12 and the fuel tank 11, together with the entire release and ejector mechanism attached thereto are also free to fall away from the wing 10 of the plane. As the piston rod 16 and the bearing members 29, 30 complete their travel, they strike the top of the socket 13, further serving to eject the pylon and fuel tank from their attachment to the wing 10.

As the piston 17 travels up the cylinder 23, the pressure of the gases of combustion is reduced by the action of bleed off holes 46, in the walls of the cylinder 23. The holes 46 are disposed so that the release and ejection action of the apparatus is substantially completed before the piston 17 reaches them.

The bracket 24, which is attached to the fuel tank 11 is provided with threads 42 at the top thereof which are received within a nut member 43 welded to a cylindrical housing 47 connected to the nut 37 within the pylon structure 12. A pin 44 which is received within a transverse bore 45 in the bracket 24 serves to interconnect the block 19 of the release and ejector mechanism with the bracket 24 and tie the entire apparatus together.

It will be apparent from the foregoing that all of the forces exerted by the expanding gases within the block 19 and cylinder 23, are transmitted through the shear bar 32 in double shear and torsion thereby providing a positive release of the fuel tank and pylon assembly as desired. At the same time, complete separation of the fuel tank and pylon structure from the wing is assured by the continuing operation of the piston rod 16 as it travels upwardly. The pylon and fuel tank assembly can be manually released from the aircraft or missile merely be removing the ring 41 from the socket 13. A highly dependable simplified release and ejector mechanism has therefore been provided.

Having thus fully described the invention, what is claimed as new and desired to be secured by Letters Patent of the United States, is:

1. A release and ejector mechanism for an aircraft comprising a housing, an elongated cylindrical member within the housing, an ejector attachment portion at the top of the cylindrical member and secured thereto, a piston and piston rod slidably carried within the cylindrical member, a shear torsion bar transversely disposed in the attachment portion, a socket carried by the aircraft around the attachment portion and secured thereto solely by the shear bar, a piston drive section secured to the bottom of the cylindrical member and means coupled to the piston rod and responsive to the action of the drive section to rotate a portion of the shear bar and break the shear bar and sever the connection from the socket to the attachment portion.

2. A release and ejector mechanism for an aircraft comprising a housing, an elongated cylindrical member within the housing, an ejector attachment portion at the top of the cylindrical member and secured thereto comprising a bracket, a transverse slot in the upper portion of the bracket and a threaded portion in the lower end of the bracket, a piston and piston rod slidably carried within the cylindrical member, a shear torsion bar transversely disposed in the attachment portion, a socket carried by the aircraft around the attachment portion and secured thereto solely by the shear bar, a piston drive section secured to the bottom of the cylindrical member and means coupled to the piston rod and responsive to the action of the drive section to rotate a portion of the shear bar and break the shear bar and sever the connection from the socket to the attachment portion.

3. A release and ejector mechanism for an aircraft comprising a housing, an elongated cylindrical member within the housing, an ejector attachment portion at the top of the cylindrical member and secured thereto, a piston and piston rod slidably carried within the cylindrical member, said piston being disposed at the bottom of the cylindrical member and the piston rod extending upwardly therefrom, a forked portion on the top of the piston rod, a double shear torsion bar transversely disposed in the attachment portion, a socket carried by the aircraft around the attachment portion and secured thereto solely by the shear bar, a piston drive section secured to the bottom of the cylindrical member and means coupled to the piston rod and responsive to the action of the drive section including a bar engaged by the forked portion of the piston rod and spaced bearing members interconnected by the said bar to rotate a portion of the shear bar and break the shear bar and sever the connection from the socket to the attachment portion.

4. A release and ejector mechanism for an aircraft comprising a housing, an elongated cylindrical member within the housing, an ejector attachment portion at the top of the cylindrical member and secured thereto, a piston and piston rod slidably carried within the cylindrical member, a double shear torsion bar transversely disposed in the attachment portion, a socket carried by the aircraft around the attachment portion and secured thereto solely by the shear bar, a piston drive section comprising a chambered block to receive at least one cartridge therein secured to the bottom of the cylindrical member, means to detonate the cartridge and a bore to lead the gases of combustion into the cylindrical member and means coupled to the piston rod and responsive to the action of the drive section to rotate a portion of the shear bar and break the shear bar and sever the connection from the socket to the attachment portion.

5. A release and ejector mechanism for an aircraft comprising a housing, an elongated cylindrical member within the housing, an ejector attachment portion comprising a bracket, a transverse slot in the upper portion of the bracket and a threaded portion in the lower end of the bracket at the top of the cylindrical member and secured thereto, a piston and piston rod slidably carried within the cylindrical member, said piston being disposed at the bottom of the cylindrical member and the piston rod extending upwardly therefrom, a forked portion on the top of the piston rod, a double shear torsion bar transversely disposed in the attachment portion, a socket carried by the aircraft around the attachment portion and secured thereto solely by the shear bar, a piston drive section comprising a chambered block to receive at least one cartridge therein secured to the bottom of the cylindrical member, means to detonate the cartridge and a bore to lead the gases of combustion into the cylindrical member and means coupled to the piston rod and responsive to the action of the drive section including a bar engaged by the forked portion of the piston rod and spaced bearing members interconnected by the said bar to rotate a portion of the shear bar and break the shear bar and sever the connection from the socket to the attachment portion.

6. A release and ejector mechanism according to claim 5 in which the double shear bar consists of an elongated bar having a substantially rectangular cross section and spaced weakening notches therein disposed between the ejector attachment portion and each of the bearing members.

References Cited in the file of this patent

UNITED STATES PATENTS

| | | |
|---|---|---|
| 2,288,425 | Simborg | June 30, 1942 |
| 2,356,322 | Johnson | Aug. 22, 1944 |
| 2,883,910 | Nessler | Apr. 28, 1959 |
| 2,936,676 | Robert et al. | May 17, 1960 |
| 2,948,563 | Landory | Aug. 9, 1960 |